Oct. 28, 1924.  1,513,503

W. J. HERRMANN

EYEGLASSES

Filed June 22, 1921

Inventor
W. J. Herrmann,

By
Attorney

Patented Oct. 28, 1924.

1,513,503

UNITED STATES PATENT OFFICE.

WALTHER J. HERRMANN, OF CINCINNATI, OHIO.

EYEGLASSES.

Application filed June 22, 1921. Serial No. 479,699.

*To all whom it may concern:*

Be it known that WALTHER J. HERRMANN, a citizen of the United States of America, residing at Cincinnati, in the county of Hamilton and State of Ohio, has invented new and useful Improvements in Eyeglasses, of which the following is a specification.

The object of the invention is to provide a simple, inexpensive and efficient construction of eye glass or spectacle frame or mounting with the primary purpose of reducing the cost of production and minimizing the risk of breakage or displacement of the parts by eliminating joints which are depending for their support upon the use of screws and like fastening means; and with this object in view the invention consists in a construction and combination of parts of which a preferred embodiment is shown in the accompanying drawings, wherein:—

The lens rings 10 are connected by a narrow strip of material integral therewith and extending radially therefrom as shown at 11, the intermediate portion of said strip being turned or twisted at a right angle to the plane of the rings and the portions of the strip immediately adjacent to the rings and is looped to provide the nose piece 12 which may be tempered to form a nose spring which thus is integral with the lens rings. The radially projecting stems 11 may be crimped as shown to a greater or less extent to vary the spacing of the lens rings which are flanged at their outer edges as shown at 13 to form seats for the lenses.

Figure 1:
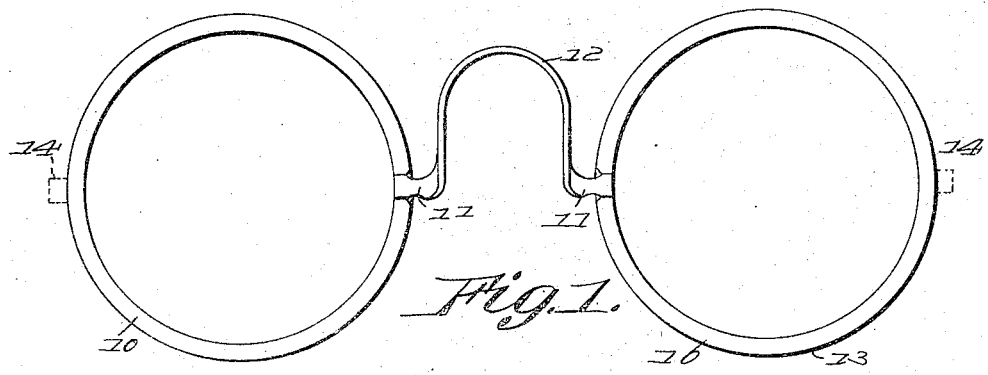
Figure 1 is a front view of an eye glass or spectacle frame embodying the invention.
Figure 2:
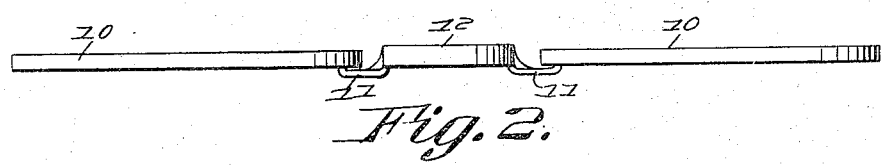
Figure 2 is a plan view of the same.
Figure 3:
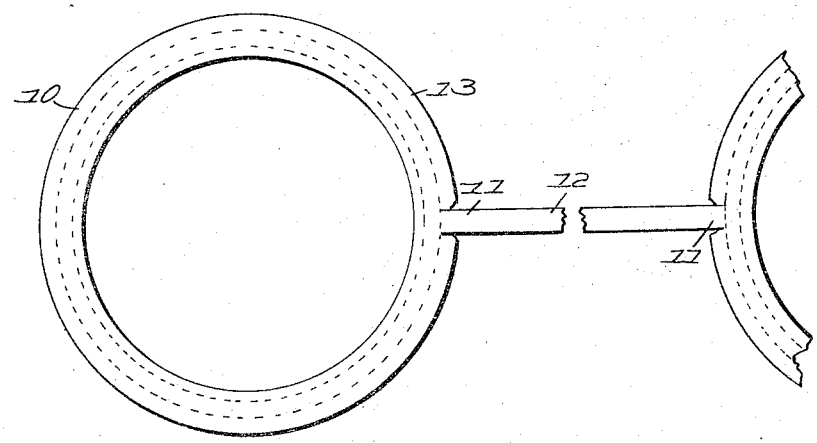
Figure 3 is a view of the blank showing the relation of the parts as the same is stamped from a sheet of metal.

This construction which as indicated in Figure 3 is adapted to be produced from a single flat sheet of any suitable metal by the operation of stamping eliminates the use of joints either soldered or provided with fastening means such as screws or the like, and contemplates the necessary adjustment of any of the lens rings by the crimping of the stems 11 which are twisted and deflected to provide the connecting extension which constitutes the nose piece. When the frame is to be used for spectacles suitable ears 14 as shown in dotted lines in Figure 1 may be formed at the outer sides of the lens rings for the attachment of the temples which obviously must be pivotally mounted, but otherwise the frame is jointless and therefore one of the principal disadvantages of eye glass and spectacle frames, to-wit the loosening of the joints, the distortion of the nose piece and the like are avoided.

Having described the invention, what is claimed as new and useful is:—

An eye glass frame formed from a blank struck from sheet material comprising continuous rings adapted to receive lenses and lying substantially in the plane of the material from which the frame is struck, there being a nose loop disposed between the rings and integrally joined therewith and including stem portions which are twisted out of the frame occupied by the rings and disposed parallel thereto, and an intermediate looped portion adapted to bridge the nose and which is disposed with its transverse breadth at right angles to the plane in which the lens rings lie.

In testimony whereof he affixes his signature.

WALTHER J. HERRMANN.